United States Patent
Wendling et al.

(10) Patent No.: US 9,077,856 B2
(45) Date of Patent: Jul. 7, 2015

(54) METHOD FOR LOCAL CONDITIONAL ACCESS FOR MOBILE EQUIPMENTS

(75) Inventors: Bertrand Wendling, Viroflay (FR); Olivier Landier, Chaville (FR)

(73) Assignee: NAGRA FRANCE SAS, Paris (FR)

( * ) Notice: Subject to any disclaimer, the term of this patent is extended or adjusted under 35 U.S.C. 154(b) by 2286 days.

(21) Appl. No.: 11/979,958

(22) Filed: Nov. 13, 2007

(65) Prior Publication Data

US 2008/0144822 A1    Jun. 19, 2008

Related U.S. Application Data

(63) Continuation-in-part of application No. PCT/EP2006/062265, filed on May 12, 2006, and a continuation-in-part of application No. 11/431,535, filed on May 11, 2006, now abandoned.

(30) Foreign Application Priority Data

May 13, 2005   (EP) ..................................... 05291046

(51) Int. Cl.
*H04N 7/167* (2011.01)
*H04L 9/28* (2006.01)
(Continued)

(52) U.S. Cl.
CPC ............ *H04N 7/1675* (2013.01); *H04H 60/23* (2013.01); *H04H 60/50* (2013.01); *H04N 21/25841* (2013.01); *H04N 21/26606* (2013.01); *H04N 21/26609* (2013.01); *H04N 21/41407* (2013.01);
(Continued)

(58) Field of Classification Search
USPC .......................................................... 726/26
See application file for complete search history.

(56) References Cited

U.S. PATENT DOCUMENTS

| 2003/0005435 A1 | 1/2003 | Nelger et al. |
| 2003/0108202 A1 | 6/2003 | Clapper |

(Continued)

FOREIGN PATENT DOCUMENTS

| EP | 1885095 A1 * | 2/2008 |
| WO | 03/090465 | 10/2003 |

OTHER PUBLICATIONS

U.S. Office Action dated Mar. 16, 2010 for corresponding U.S. Appl. No. 11/431,535.

(Continued)

*Primary Examiner* — Matthew Henning
(74) *Attorney, Agent, or Firm* — Harness, Dickey & Pierce, P.L.C.

(57) ABSTRACT

In one embodiment of the present invention, a method is disclosed for conditional access to a digital data stream encrypted with at least one first control word and broadcasted via an emitter of a broadcasting network to at least one mobile equipment, the latter also being connected via a mobile communication network to a management center, the stream containing control messages encrypted with a transmission key and including a second control word obtained by the encryption of the first control word with a local key, the method includes the following steps: reception by the mobile equipment of at least one cryptogram via the mobile network, determination of at least one local key from the received cryptogram, reception of a control message via the broadcasting network, decryption of the message and obtaining the second control word, decryption of the second control word with the local key and obtaining the first control word, and decryption of the data of the stream with the first control word.

11 Claims, 2 Drawing Sheets

(51) Int. Cl.
*H04H 60/23* (2008.01)
*H04N 21/258* (2011.01)
*H04N 21/266* (2011.01)
*H04N 21/414* (2011.01)
*H04N 21/422* (2011.01)
*H04N 21/4405* (2011.01)
*H04N 21/442* (2011.01)
*H04N 21/643* (2011.01)
*H04H 60/50* (2008.01)

(52) U.S. Cl.
CPC ..... *H04N 21/42202* (2013.01); *H04N 21/4405* (2013.01); *H04N 21/44236* (2013.01); *H04N 21/64315* (2013.01)

(56) References Cited

U.S. PATENT DOCUMENTS

| | | |
|---|---|---|
| 2003/0181160 A1 | 9/2003 | Hirsch |
| 2005/0013439 A1 | 1/2005 | Collet |
| 2005/0100162 A1 | 5/2005 | Alve et al. |
| 2005/0100167 A1 | 5/2005 | Alve et al. |
| 2006/0112188 A1* | 5/2006 | Albanese et al. ............. 709/238 |
| 2007/0002885 A1* | 1/2007 | Lee et al. ...................... 370/432 |
| 2007/0070978 A1* | 3/2007 | Bell et al. ...................... 370/352 |
| 2009/0325576 A1* | 12/2009 | Moreillon ..................... 455/434 |

OTHER PUBLICATIONS

European Search Report, dated Jul. 8, 2003.

* cited by examiner

METHOD FOR LOCAL CONDITIONAL ACCESS FOR MOBILE EQUIPMENTS

The present application is a continuation-in-part and claims priority under 35 U.S.C. §365 of pending PCT application PCT/EP2006/062265, filed on May 12, 2006 and is a continuation-in-part and claims priority under 35 U.S.C. §120 of U.S. application Ser. No. 11/431,535, filed May 11, 2006 now abandoned, each of which claim priority to European Application Number EP 05291046.0, filed May 13, 2005, the entire contents of each of which are hereby incorporated herein by reference.

TECHNICAL FIELD

The invention concerns the domain of conditional access to a digital data stream broadcasted through a wireless channel and received by a plurality of mobile equipments, such as, for example, mobile telephones, PDAs (Personal Digital Assistants), portable digital television receivers or a portable computers.

The broadcasted data is encrypted and can be received in plain text only by authorized equipment when the user has acquired the necessary rights. These rights, stored in a security module associated to the mobile equipment, consist of a set of keys that allow the decryption of the control words contained in control messages ECM (Entitlement Control Message) broadcasted in the audio data/video stream.

A security module is considered as a tamper-proof device containing different encryption/decryption keys, information serving to identify a user on a network and the data that defines the rights purchased by the user for reception of a broadcasted content. The security module can take different forms such as a removable smart card inserted into a reader, an integrated circuit soldered onto a mother board or a card of the SIM type (Subscriber Identity Module) that is installed in the majority of mobile equipments.

PRIOR ART

At present, a mobile equipment configured for the reception of digital television programs is based on standard technologies such as OMA (Open Mobile Alliance), DVB-H (Digital Video Broadcast, Handheld), or DMB (Digital Multimedia Broadcasting) that is in certain ways a broadband extension of (Digital Audio Broadcasting).

OMA technology implements a complete unique solution for a given market such as that of mobile telephones where each equipment and the content suppliers support the OMA technology.

DVB technology has been designed to standardize digital television decoders (set top boxes) with the objective of reducing their costs at large scale. It standardizes the elements involved at the level of conditional access to the content broadcasted in MPEG-2 or MPEG-4 format for mobile television on the Internet. These elements consist of the encryption algorithm of the broadcasted content, the control messages ECM containing the decryption keys or control words, the management messages EMM containing the rights of the users and the interface between the decoder and the security module managing conditional access.

In the particular case of DVB-H mobile television, the protection of the content is developed by the group DVB-CBMS (Digital Video Broadcasting-Convergence of Broadcast and Mobile Services).

Standardization does not extend neither to the content with added value of the ECM and EMM messages, nor to the protection method of the latter. Each conditional access supplier uses its own data structure and its own protection means for a broadcasted content. Therefore, DVB technology offers numerous possibilities for the development of the security of the content.

The drawback of a too advanced standardization as that of OMA technology lies in the fact that additional protection measures are restricted especially when the conditional access system has been pirated by third parties.

In DVB technology, the discovery of one or several control words contained in the control messages ECM allows the decryption of the stream without having to acquire a subscription or pay for the pay-per-view broadcasted programs. This piracy causes damage that affects both the content supplier as well as the supplier of conditional access.

The document WO2004084555 describes an access method using a mobile telephone with information services broadcasted via a first communication channel to a receiver device. This method includes the following steps:

storage in the mobile telephone of access control data allowing access to information received by the receiver device via the first channel, establishment of a communication between the receiver device and the mobile telephone via a second wireless low range local channel of the Bluetooth or WiFi (Wireless Fidelity) type according to the standards IEEE 802.11, transmission of the access control data stored in the mobile telephone to the receiver device via the second channel in order to authorize access to information services broadcasted via the first channel.

The reception of access control data via a second channel independent of the channel for broadcasting controlled access services certainly allows the improvement of the protection of this data against piracy, but not limiting the extent of the effects of a possible discovery of the decryption keys or of means for their production.

SUMMARY OF THE INVENTION

The aim of the present invention is to provide countermeasure means in the event of piracy independently of the type of mobile equipment and at a relatively low cost. These means act on the protection elements that are not related to the standardization and that are preferably adjustable by the conditional access provider.

Another aim is to limit the damaging effects of a possible piracy to a number as reduced as possible of mobile equipments.

These aims are achieved by a method for conditional access to a digital data stream encrypted with at least one first control word and broadcasted via an emitter of a broadcasting network to at least one mobile equipment, the latter also being connected via a mobile communication network to a management center, said stream containing the control messages encrypted with a transmission key and comprising a second control word obtained by means of the combination of the first control word with a local seed, said method comprises the following steps:

receiving by the mobile equipment of at least one cryptogram via the mobile network, determining of at least one local seed from the received cryptogram, receiving a control message via the broadcasting network, decryption of said message and obtaining the second control word, combining the second control word with the local seed and obtaining the first control word, decrypting the data of the stream with the first control word.

The method stands out by the use of a cryptogram containing, for example, localization information of the mobile equipment. The access to the data of the stream is thus only authorized to mobile equipments situated in a given geographic area.

The discovery of a control word encrypting the data of the stream will thus have consequences limited to mobile equipment functioning in a district or in a town without extending to all the equipment in the country, for example.

According to a first embodiment, the broadcasted stream consists of the content encrypted by first control words and control messages. The control messages, sent with the broadcasted stream, each contain second control words resulting from the combination of the first control words with a local seed. Each mobile equipment is first connected to a mobile network of the GSM (Global System for Mobile Communications) or UMTS (Universal Mobile Telecommunications System) type or another through which it is located by the management center. The mobile equipment receives from this center a cryptogram containing local identifiers corresponding to that of the nearest network cells to its geographical position. This cryptogram transmitted to the security module of the equipment allows the determination of one or more local seeds that are defined as functions of the local identifiers. A local seed can by a local key that is later used to decrypt the second control word to obtain the first control word, or a seed to apply a HashMAC on the second control word, the local seed being the initialization vector of the HashMac function. According to this embodiment, the cryptogram contains data pertaining to the identification of the broadcast transmitters or the mobile network cells. In case of blackout function (or hot spot function), the reception is forbidden (or only allowed in the case of hot spot function) in a specific area defined by the identification of the broadcast transmitters or the mobile network cells. This cryptogram is then necessary to arrive to the security module in order to enforce the blackout (or hot spot) function. In case that the cryptogram is intercepted by the mobile equipment and not passed to the security module, the same is not able to obtain the final control word and thus the access to the audio/video data is not possible. Since the security module necessarily receives the cryptogram containing the location data (identification of the broadcast transmitters or the mobile network cells), this module can now compare the list provided by the cryptogram and the current identifier of the broadcast transmitters or the mobile network cells. This current information is extracted either from the broadcast signal received or the mobile cell identification data.

Several keys can be generated from a cryptogram thus allowing the decryption of the control words broadcasted by nearby emitters when the equipment moves from one region to another, for example.

The mobile equipment gets this function and/or its parameters, via management messages EMM that it can receive, for example, from the management center when connected to the GSM or UMTS mobile network. A particular request by short message SMS, post or telephone call, for instance, would be an alternative for obtaining this function.

The cryptogram can be formed, for example, by carrying out a XOR function (OR exclusive) on the identifier of the cell, according to a simple embodiment. According to an embodiment with a higher security level, a cryptographic function using a random number combined with the identifier of the cell transmitted by the mobile network can be used.

According to one embodiment that allows the mobile equipment to move from one cell to another, two solutions are possible:

a) several cryptograms corresponding to surrounding cells can be transmitted to the mobile equipment when it connects to the first cell. The security module can also determine the local keys necessary for the decryption of the controls words from the following cells.

b) a set of local keys can be determined from only one received cryptogram allowing the decryption of the controls words from different cells. This cryptogram contains, for example, a chain of local keys corresponding to consecutive cells.

The control messages ECM broadcasted in the stream specific to a given region because they contain control words that can only be decrypted by a local key that is determined from parameters specific to a mobile network of a given place.

After decryption of the ECM messages with the transmission key, the control words are extracted. The local key, determined thanks to the received cryptogram, allows determining the original control words for decrypting the content broadcasted on the condition to have the necessary rights in the security module.

These rights are obtained from management messages EMM broadcasted through a conditional access system CAS whose server is connected to that of the operator of the GSM or UMTS mobile network or the management center.

BRIEF DESCRIPTION OF THE DRAWINGS

The invention will be better understood thanks to the following detailed description that refers to the annexed figures given as non-limitative examples.

DETAILED DESCRIPTION OF THE DRAWINGS

A stream of digital data forming a content (C) encrypted with control words (CW) is broadcasted with control messages ECM. This digital data can also comprise audio/video data of television programs as well as data relating to applications that can be operated by a mobile equipment.

A server of a conditional access supplier (CA) is connected to a server of an operator (OP) managing a broadcasting network (NET1) and a mobile network (NET2). The operator (OP) broadcasts on the broadcasting network (NET1) the content (C) encrypted with the first control words CW as well as the ECM messages containing a second control word CW' encrypted with a local key (KL1, KL2). This local key is specific to the geographic location of the emitter (E1, E2) of the broadcasting network such as a district, a town or a region. Moreover, the access supplier (CA) broadcasts management messages EMM that define the access rights to the content according to the user's purchases as a subscription or a prepayment of selected programs.

Figure 1:
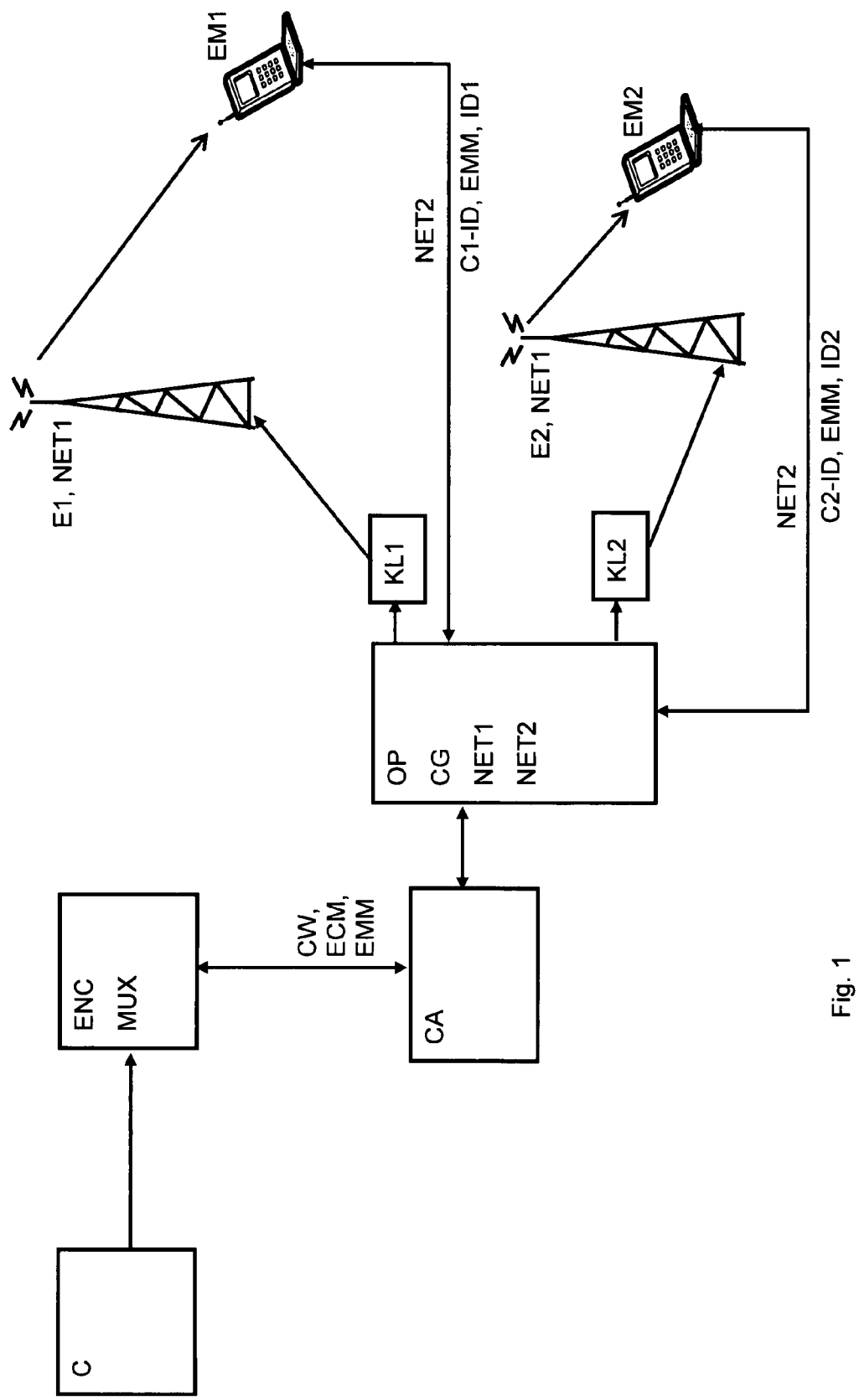
FIG. 1 shows a block diagram of an example of configuration with two emitters placed in different locations and that can be got by local mobile equipment.

The mobile equipments EM1, EM2 are connected respectively to the broadcasting network (NET1) and to the mobile network (NET2). The broadcasting network (NET1) provides the encrypted content while the mobile network (NET2) provides the parameters necessary for the reception of the content (C). The broadcasting network (NET1) can be, for example, of the DVB-H type where the content is broadcasted through a radio channel by a local emitter (E1, E2), the mobile network (NET2) will be of the GSM or UMTS type for example, also allowing communications with the management center (CG) of the operator (OP), (see FIG. 1).

The emitters (E1, E2) of the broadcasting network (NET1) broadcast the digital data in a unidirectional way towards the mobile equipment (EM1, EM2) while the data of the mobile network (NET2) flows in a bidirectional way between the mobile equipment (EM1, EM2) and the management center (CG).

The mobile equipments (EM1, EM2) can move from one cell of the mobile network (NET2) towards another maintaining the possibility of receiving the data broadcasted by either of the emitters of the broadcasting network (NET1).

Figure 3:
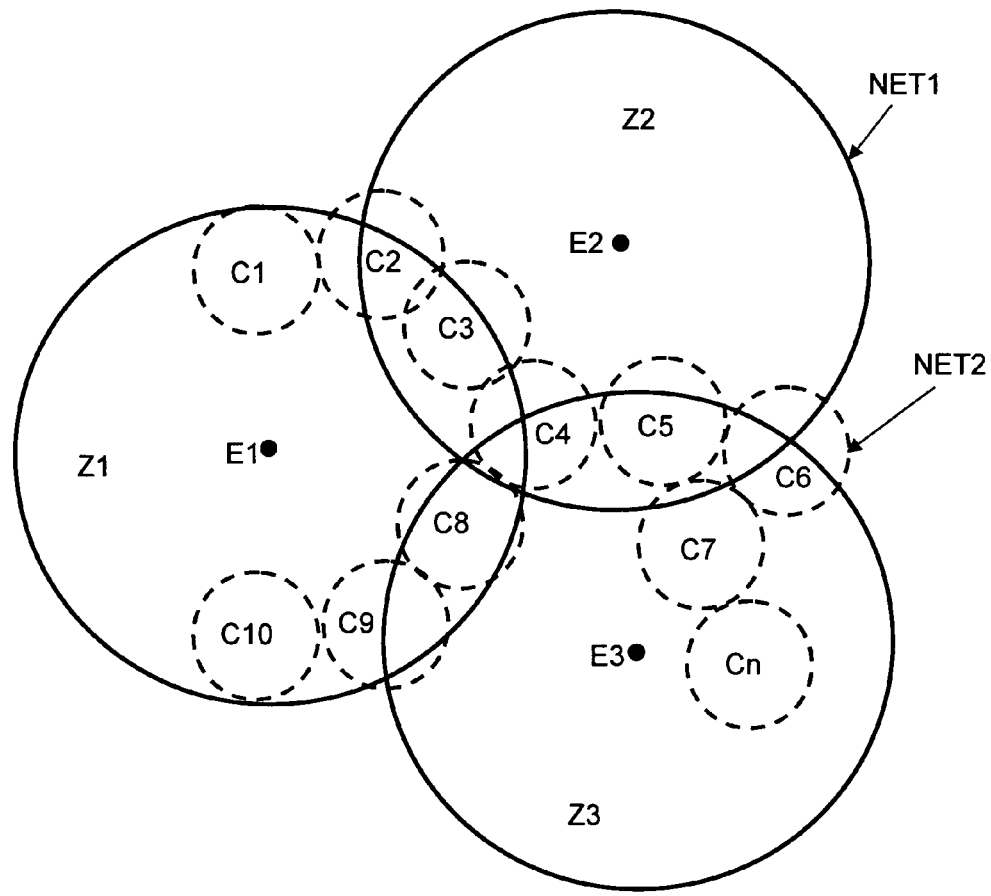
FIG. 3 shows a schematized example of broadcasting areas of emitters of the broadcasting network and cells of the mobile network inside these broadcasting areas.

FIG. 3 shows this type of situation where cells (C1-C10-Cn) of the mobile network (NET2) form meshes that extend over one or more broadcasting areas (Z1, Z2, Z3) of the emitters (E1, E2, E3) of the network (NET1). When a mobile equipment is moved, for example, from the first broadcasting area (Z1) towards the third broadcasting area (Z3), it can receive a set of keys corresponding to the cells that it traverses, for example the keys of cells C1 to C7 of the illustrated example. These local keys allow the mobile equipment decrypting the control words of ECM messages in the areas (Z1) and (Z3) covered by emitters (E1) and (E3). According to one alternative, the mobile equipment receives a local key each time it enters into a cell during its displacement. When the cell crosses two or several broadcasting areas, such as for example the cells C2 to C6, the mobile equipment can receive as many keys as the number of broadcasting areas covered by the cell.

In the example of FIG. 3, the cell (C4) extends over the three broadcasting areas (Z1, Z2, Z3). In this case, the mobile equipment can receive the three local keys allowing it to operate the data transmitted by each emitter (E1, E2, E3).

Both the broadcasting and mobile networks (NET1, NET2) can be of the same type as long as the bandwidth is sufficient for simultaneous transmission of a digital content and of bidirectional data exchanges. For example, a network of the type UMTS, EDGE (Enhanced Data Rates for Global Evolution) or another type can be provided.

The local ECM or more precisely the local control words CW' are created by the management center (CG) of the mobile operator (OP) from the original control-words CW by encryption of this word with a local key (KL1, KL2). The new control word CW'=KL1(CW) or KL2(CW) obtained in this way is inserted into the ECM messages broadcasted by the emitter (E1, E2) of the broadcasting network (NET1) to mobile equipments (EM1, EM2) connected to the mobile network (NET2). These equipments are situated in a cell of the mobile network (NET2) where they can receive the cryptogram necessary for obtaining the local key (KL1, KL2). (See FIG. 2, embodiment (1))

It should be noted that the broadcasted control messages ECM are encrypted with a transmission key (TK) supplied to the mobile equipment (EM1, EM2) by means of management messages EMM delivered by the access supplier (CA) via the management center (CG).

According to a first embodiment, the local key (KL1, KL2) is determined by the mobile equipment when it connects to the mobile network (NET2) by means of localization data or more precisely an identifier of a cell (C1-ID, C2-ID) of this network transmitted by the management center (CG). The local key can be determined in several ways:

calculation carried out by means of an operation or a relatively simple mathematical function such as for example XOR (OR exclusive) or from a random number transmitted by the management center.

combination with a key specific to the mobile network or to a node of the latter provided either when the mobile equipment connects to the management center, or in response to a particular request by a short message SMS, for example.

the transmitted cryptogram can form the local key that can be used as it is, without intermediate calculation by the mobile equipment for decrypting the local control words.

To summarize, this local key is necessary for the decryption of the control words CW' contained in the local ECM broadcasted in the digital data stream in order to obtain the original control words CW effectively encrypting the broadcasted content.

In the case where the cryptogram contains a list of mobile cells (or broadcast cells) identifiers (C1-ID, C2-ID) for blackout (or hot spot) purpose, the management message containing the list of identifiers can be sent via the broadcast network (NET1) or via the mobile network (NET2). The keys (first control words) used to encrypt the data stream is not sent in the control messages (ECM) but a derivate of the first control words i.e. the second control words, are sent to the mobile equipments. From the list of identifiers, a digest is calculated using various methods such as CRC16, Hashing function in order to produce a single value in which all identifiers of the cells have interacted. This digest can then be used to produce the first control word by any type of combination with the received second control word. Example of combination is a XOR function, encryption, the digest being used as a key, or concatenation. The cryptogram can contain the list of mobile cell identifiers or the list of broadcast identifiers. Depending on the blackout (or hot spot) geographic policy, the broadcast cells are used to define the blackout coverage instead of the mobile cells. Both identifiers can be combined in order to obtain a more precise limit between the authorized and forbidden areas.

The mobile equipment receives the identifier of the mobile cell with which it is connected as well as the identifier of the broadcast cell from which it receives the broadcast signal. In a first case based on the mobile cell identifiers, only the identifier pertaining to the mobile network is passed to the security module. In a second case based on the broadcast cell identifiers, only the identifier of the broadcast cell is passed to the security module. In a third case, both mobile and broadcast identifiers are passed to the security module. These information are passed to the security module to enforce the blackout (or hot spot) function. These information are compared with the content of the cryptogram which list the identifiers to blackout (or authorize).

According to one alternative the mobile equipment is provided with a Global Positioning System of the GPS type (Global Positioning System) that determines the coordinates corresponding to its geographical position. This data is then used to determine the local key from the received cryptogram.

According to a second embodiment, the transmission key (TK) encrypting the control messages ECM can also depend on the broadcasting emitter. This configuration thus provides two security levels to be overcome in order to access the content broadcasted in the stream. When the mobile equipment is connected to the mobile network, it receives a management message EMM containing the local transmission key (TKL) or elements suited for determining said key (parameters, calculation functions). The message EMM is transmitted in general only if the local transmission key (TKL) is not available in the security module of the mobile equipment or after a key change. In fact, the validity of the latter, for example, can be limited to a certain period for a given emitter.

After having obtained this key (TKL) allowing the decryption of the control messages ECM, the mobile equipment determines the local key(s) (KL1, KL2) necessary for the decryption of the control words CW' contained in the ECM messages. These local keys (KL1, KL2) are determined according to the processes described above.

The localization data such as the network cell identifiers or the position coordinates of the mobile equipments can be used in order to prevent access to certain content broadcasted to mobile equipments located in a given region. In fact, the ECM broadcasted and associated to a predetermined content contain a control word encrypted with a key which cannot be obtained from certain cell identifiers because, for example, the calculation function of the key does not have the adequate parameters. In other words, this restriction allows certain places to be blocked out from the reception of the broadcasted contents.

According to one configuration, a network key or a node can be specific to a broadcasted channel. When a mobile equipment is situated in a given place, the local identifier provided from the node key or the node key itself cannot be transmitted by the management center, which prohibits the reception of this channel near the node in question.

Figure 2:
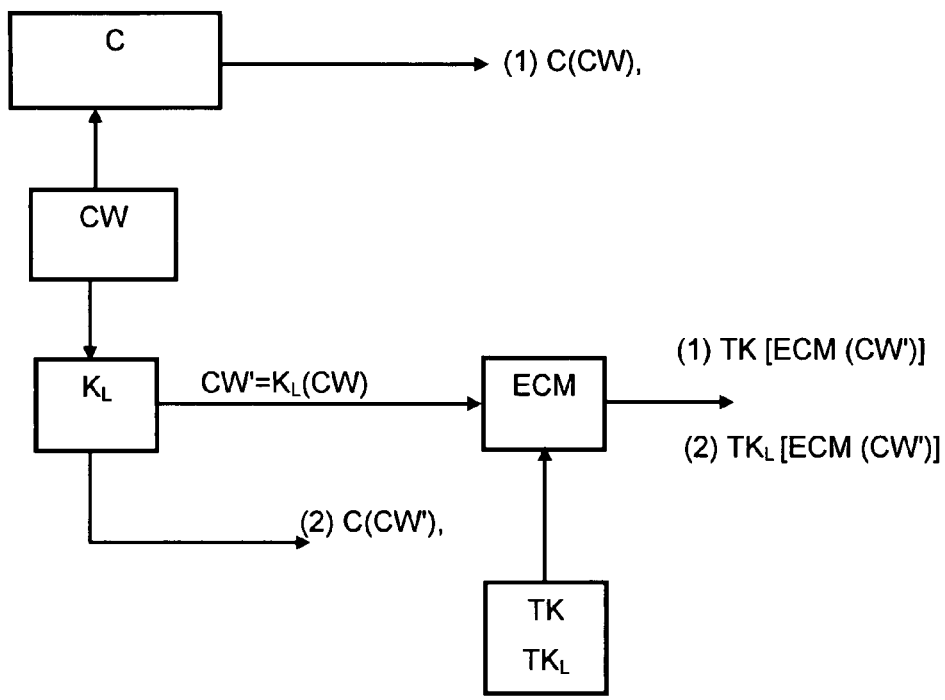
FIG. 2 shows a block diagram of the encryption of the control word of a control message with a local key and the encryption of a control message with a transmission key.

According to another configuration, (see FIG. 2, embodiment (2)) the local broadcasting operator(s) decrypt the stream with the original control word CW for re-encrypting it with local control-words (CW'1, CW'2). The local emitters (E1, E2) each broadcast then a stream encrypted with local control words (CW'1, CW'2) and local ECM messages containing these control words (CW'1, CW'2) specific to each emitter (E1, E2). The mobile equipment of a user is connected to the mobile network in order to receive a management message EMM containing at least one local transmission key (TKL) allowing the decryption of the local ECM messages in order to extract the control words (CW'1, CW'2).

The management message EMM can be received either automatically after the establishment of a connection recognized by the mobile network (NET2) or on request by means of a short message SMS, for example.

Of course, it could also be possible for the mobile equipment to receive a set of local transmission keys (TKL) in the EMM message when it connects to a cell of the mobile network (NET2). This set allows decrypting the ECM messages sent from nearby emitters when the mobile equipment moves from one broadcasting area to another without requesting an EMM message from each cell.

The invention claimed is:

1. A method of conditional access to a digital data stream encrypted with at least one first control word and broadcast via an emitter of a unidirectional broadcasting network to at least one mobile equipment including a security module, the at least one mobile equipment also being connected via a bidirectional mobile communication network to a management center, said method comprising:
receiving, by the mobile equipment, at least one cryptogram from the management center via the bidirectional mobile communication network, said broadcasted digital data stream including control messages encrypted with a transmission key and including a second control word obtained by a combination of the at least one first control word with a local seed;
determining, by the security module of the mobile equipment, the local seed from the received at least one cryptogram, wherein the local seed depends on identifiers of network cells of the bidirectional mobile communication network that are geographically nearest relative to the mobile equipment,
receiving, by the mobile equipment, a control message via the unidirectional broadcasting network, decrypting said control message and obtaining the second control word, and
combining, by the security module of the mobile equipment, the second control word with the local seed, obtaining the first control word, and decrypting the broadcast digital data stream using the first control word.

2. The method according to claim 1, wherein the local seed contains a list of identifiers of broadcast cells of the unidirectional broadcasting network, and the method further includes calculating a digest of the list of identifiers, said digest being combined with the second control word to produce the first control word.

3. The method according to claim 2, wherein the digest is a key that decrypts the second control word.

4. The method according to claim 2, wherein the digest is an initialization vector of a HashMAC function performed on the second control word.

5. The method according to claim 1, wherein the local seed contains a list of identifiers of mobile cells of the bidirectional mobile communication network, and the method further includes calculating a digest of the list of identifiers, said digest being combined with the second control word to produce the first control word.

6. The method according to claim 1, wherein the local seed contains a list of identifiers of broadcast cells of the unidirectional broadcasting network and the mobile cells of the bidirectional mobile communication network, and the method further includes calculating a digest of the list of identifiers, said digest being combined with the second control word to produce the first control word.

7. The method according to claim 1, further comprising:
receiving an identifier of a broadcast cell from which the mobile equipment is receiving the digital data stream,
comparing said identifier with the identifiers contained in the cryptogram, and
allowing or forbidding access to the digital data stream depending on the result of the comparison.

8. The method according to claim 1, further comprising:
receiving an identifier of a mobile cell from which the mobile equipment is connected with the bidirectional mobile communication network,
comparing said identifier with the identifiers contained in the cryptogram, and
allowing or forbidding access to the digital data stream depending on the result of the comparison.

9. The method according to claim 1, wherein the cryptogram is transmitted by the management center, via the bidirectional mobile communication network, when the mobile equipment is connected to the bidirectional mobile communication network.

10. The method according to claim 1, wherein the cryptogram is transmitted by the management center, via the broadcast cells, when the mobile equipment is connected to the unidirectional broadcasting network.

11. The method according to claim 1, wherein the local seed is a local key that decrypts the second control word to obtain the first control word.

* * * * *